July 11, 1967 W. W. BURROUGHS, JR 3,330,520

SLOTTED GIMBAL

Filed Sept. 29, 1965

INVENTOR.
William W. Burroughs, Jr.
BY
Thomas N. Young
ATTORNEY

United States Patent Office 3,330,520
Patented July 11, 1967

3,330,520
SLOTTED GIMBAL
William W. Burroughs, Jr., Manchester, Mass., assignor to General Motors Corporation, Detroit, Mich., a corporation of Delaware
Filed Sept. 29, 1965, Ser. No. 491,230
5 Claims. (Cl. 248—358)

ABSTRACT OF THE DISCLOSURE

A gimbal for gyro mounting including a closed band-like structure of rigid material, such as magnesium, having a plurality of circumferentially extending slots which are filled with a visco elastic material to damp vibration and shock.

Summary of the invention

This invention relates to gimbal systems of the type used to support inertial measurement units and more particularly to a gimbal ring structure which is designed to inhibit the transfer of vibrational disturbances through the gimbal ring structure.

The measurement unit of an inertial guidance system for an airborne vehicle generally includes a platform which is stabilized by gyros and carries a triad of accelerometers for obtaining velocity and distance information for vehicle position and attitude control purposes. Generally this inertial measurement unit is mounted in the vehicle by means of a gimbal system which isolates the inertial measurement unit from vehicle motion. A gimbal system comprises a concentric arrangement of relatively rotatable rings of graduated size to support the inertial measurement unit for freedom of motion about three axes, namely, the vehicle azimuth, roll and pitch axes. The gyroscopes and accelerometers which are part of the inertial measurement unit are extremely sensitive instruments and can be adversely affected by vibrational disturbances.

In accordance with the present invention, a gimbal ring structure is provided having a vibration damping characteristic. To provide this characteristic the gimbal structure basically comprises a ring or band-like structure of substantially rigid material formed about a center axis and having at least one set of diametrically opposed trunnion holes which may be used to mount the gimbal ring for rotation about an axis which is perpendicular to the center axis. This basic structure has formed therein a plurality of parallel slots which penetrate the gimbal structure and are spaced along the center axis at predetermined intervals. These parallel slots, which extend over the band-like structure between the trunnion holes and which terminate adjacent but circumferentially spaced from the trunnion holes, are filled with a visco elastic material thus to form an integral structure which has the capability of absorbing vibrational disturbances and preventing the transfer thereof across the gimbal structure, yet is dimensionally stable and easily manufactured.

A gimbal structure such as described above may be employed in an inertial measurement unit suspension system to effectively prevent the transfer of vibrational disturbances from an external source to the inertial measurement unit by virtue of the damping action provided by the filled slots. In a multigimbal system, it may be desirable to construct several or possibly all gimbals in accordance with the present invention. Since the damping mechanism which is provided by the present invention is somewhat directionalized in character, the use of a plurality of rings would ensure substantial vibration damping along the three vehicle axes.

A detailed description of a specific embodiment of the invention is given in the following specification which is to be taken with the accompanying drawings of which:

Figure 1:
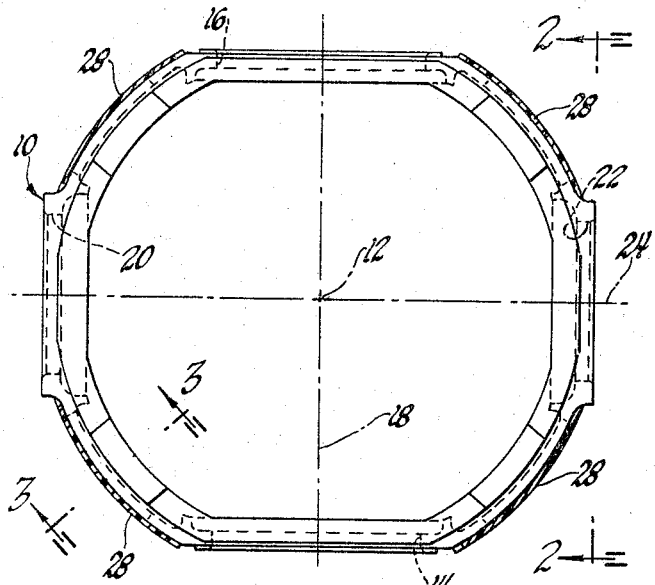
FIGURE 1 is a plan view of a gimbal ring structure which is constructed in accordance with the invention.
Figure 2:
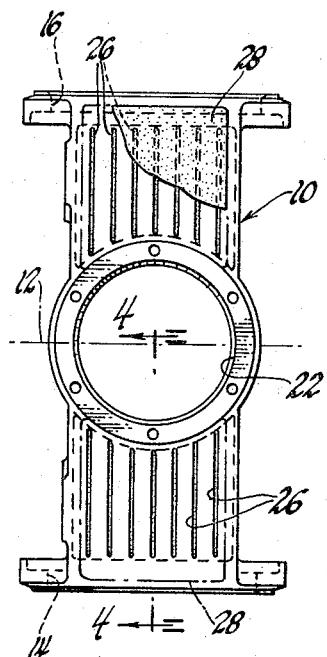
FIGURE 2 is an end view of the gimbal ring illustrating the nature and position of the slots therein.

Referring to FIGURES 1 and 2, the gimbal structure 10 is shown to comprise an integral ring or band of substantially rigid material such as cast magnesium formed about a center axis 12 of symmetry. The gimbal structure has formed therein a first pair of trunnion holes 14 and 16 located at diametrically opposite points along an axis 18 which is orthogonal to the center axis 12. The trunnion holes 14 and 16 permit the gimbal structure 10 to be rotatably mounted with respect to external means such as another gimbal ring or other support means. Gimbal structure further includes a second set of trunnion holes 20 and 22 of slightly smaller diameter than holes 14 and 16 and also located at diametrically opposite points along an axis 24 which is mutually orthogonal to axes 18 and 12. Accordingly the trunnion holes 14 and 16, 20 and 22 are spaced at 90° intervals about the gimbal structure 10. Trunnion holes 20 and 22 permit internal means such as an inertial measurement unit or another gimbal ring to be rotatably mounted with respect to gimbal structure 10.

Figure 4:
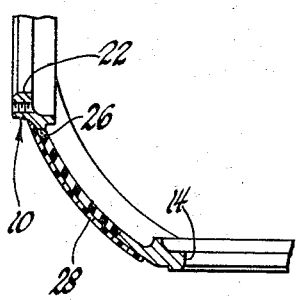
FIGURE 4 is a sectional view taken along line 4—4 of FIGURE 2.

As best shown in FIGURE 1, the gimbal structure is generally annular in side view having four flat portions formed by the trunnion hole locations and joined by four arcuate quadrants. Each of the quadrants may be ribbed as shown in FIGURE 4 to provide rigidity. The entire structure 10 may be cast as one piece.

Figure 3:
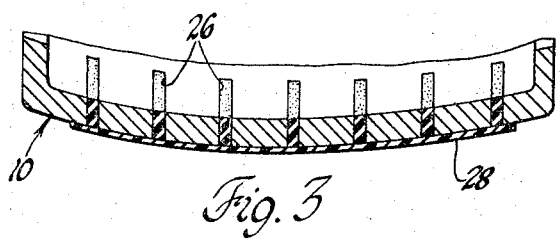
FIGURE 3 is a sectional view taken along a line 3—3 of the gimbal structure shown in FIGURE 1.

As shown in FIGURES 2, 3 and 4, the quadrants between the trunnion holes of the gimbal structure 10 have formed therein a plurality of narrow slots 26 which lie in parallel planes spaced at equal intervals along the center axis 12. The slots 26 are cut through the gimbal structure 10 from the radially outer surface to the radially inner surface thereof and extend circumferentially between the collars surrounding the trunnion holes. However, the boundaries of the slots 26 are adjacent but circumferentially spaced from the trunnion holes such that the slotted structure remains integral.

As best shown in FIGURE 3, the slots 26 are filled with a visco elastic damping material which may be obtained from Barry Control, Incorporated. This material may be gravity fed into the slots and cured after which the inner and outer surfaces of the gimbal structure 10 are covered with a sealing tape 28 thus to seal the visco elastic material in the slots 26.

Figure 5:
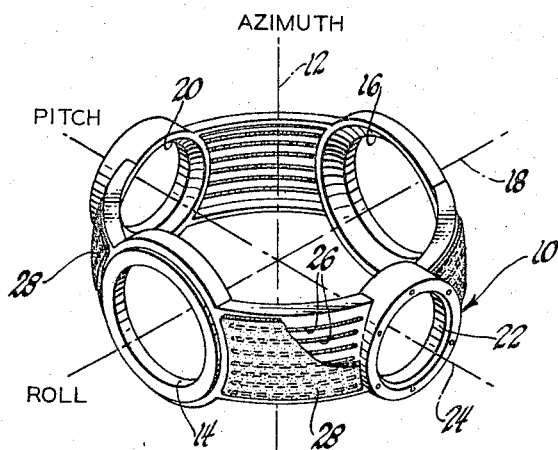
FIGURE 5 is a perspective view of the gimbal ring illustrating how the ring may be placed in the gimbal system for an inertial measurement unit.

As best shown in FIGURE 5, the slotted gimbal structure 10 may be used as the outer gimbal in a four gimbal, all attitude suspension system. In this position, the center axis 12 of the gimbal ring may define the azimuth axis for the inertial measurement unit, the first perpendicular trunnion hole axis 18 may define the roll axis of the vehicle in which the gimbal structure 10 is mounted and the second trunnion axis 24 may define the vehicle pitch axis. When used as an outer gimbal, trunnion holes 14 and 16 are used to mount the gimbal structure 10 rotatably in a support structure and a middle gimbal is rotatably mounted in the trunnion holes 20 and 22.

It can be seen that the filled slots 26 are primarily effective to damp vibrational disturbances which are directed along the azimuth axis. Therefore, the transfer of externally caused vibrations across the gimbal structure 10 from the support structure to the internal gimbals is effectively suppressed by absorption of the vibrational disturbances by the visco elastic material filling the slots 26. It may be desirable to use in addition to gimbal structure 10, similar vibration damping structures for the middle and inner gimbal rings.

Although the dimensions of the gimbal structure 10 may vary indefinitely, a set of rough exemplary dimensions may be given to establish the relative sizes of the various parts of the embodiment shown in the figures. The overall diameter of the ring structure 10 may be approximately 12 inches, the radial thickness of the arcuate portion being approximately 3/16 of an inch. It is to be noted that neither the dimensions nor the shape of a gimbal which is constructed in accordance with the invention is limited to that shown in the figures. As will be apparent to those skilled in the art, it is often advantageous to produce relatively square or rectangular or round or elliptical gimbal rings depending upon the geometry of the system into which it is to be placed. Accordingly, it is to be understood that by "ring" or "band-like" a closed continuous structure which is formed about a center axis is contemplated rather than any particular geometrical configuration.

Consistent with foregoing dimensions, the slots may be approximately 0.06 inch in width and spaced a typical distance of 1/2 inch apart. However, it is to be understood that the geometry and spacing of the slots will be dependent upon the vibrational environment in which the gimbal structure is to be used.

It is to be understood that the foregoing description of a specific embodiment is exemplary and illustrative in nature and is not to be construed in a limiting sense. For a definition of the invention reference should be had to the appended claims.

I claim:

1. For use in a gimbal suspension system, a vibration damping gimbal comprising a ring of substantially rigid material forming a closed band-like structure about a center axis and having at least one set of diametrically opposite trunnion holes along an axis perpendicular to said center axis for rotatable connection to support means, the gimbal having formed therein a plurality of circumferentially extending parallel slots fully penetrating the ring and spaced along the center axis and terminating adjacent but circumferentially spaced from said trunnion holes, and a visco elastic material disposed within the slots, the combination being effective to damp vibrations along the center axis.

2. For use in a multigimbal suspension system, a vibration damping gimbal ring comprising a closed band-like structure of substantially rigid material having a center axis and at least one set of diametrically opposite trunnion holes along an axis perpendicular to said center axis for rotatably connecting the structure to support means, the gimbal structure having formed therein a plurality of circumferentially extending parallel and fully penetrating slots at spaced intervals along the center axis thereof and terminating adjacent but spaced from said trunnion holes, and a visco elastic material disposed within the slots, the combination being effective to damp vibrations along the center axis.

3. For use in a multigimbal suspension system, a vibrational damping gimbal ring comprising a closed band-like structure of substantially rigid material having an inner surface and an outer surface defined about a center axis and at least one set of diametrically opposite trunnion holes along an axis perpendicular to said center axis for rotatably connecting the structure to support means, the gimbal structure having formed therein a plurality of parallel slots communicating between the inner and outer surfaces at spaced intervals along the center axis thereof and terminating adjacent but spaced from said trunnion holes, a visco elastic material disposed within the slots, and sealing means disposed over the inner and outer surfaces for sealing said slots, the combination being effective to damp vibrations along the center axis.

4. For use in a multigimbal suspension system, a vibration damping gimbal ring comprising a closed band-like structure of substantially rigid material having a center axis, a first pair of diametrically opposite trunnion holes along a first axis transverse to said center axis for rotatable connection of said structure with an external body, and a second pair of diametrically opposite trunnion holes along a second axis transverse to said center axis for rotatable connection of said structure to an internal body, the first and second axes being mutually perpendicular, the gimbal structure having formed therein a plurality of parallel slots at spaced intervals along the center axis thereof and terminating adjacent but spaced from said trunnion holes, and a visco elastic material disposed within the slots, the combination being effective to damp vibrations along the center axis.

5. A gimbal ring structure as defined in claim 4 further including sealing means disposed over the slots for sealing the visco elastic material therein.

References Cited

UNITED STATES PATENTS

| | | | |
|---|---|---|---|
| 2,246,738 | 6/1941 | Lauck | 74—5.5 X |
| 2,258,550 | 10/1941 | Frese | 248—358 |
| 3,078,969 | 2/1963 | Campbell et al. | 188—1 X |
| 3,088,561 | 5/1963 | Ruzicka | 188—1 X |
| 3,260,123 | 7/1966 | Dickie | 248—358 X |

CHANCELLOR E. HARRIS, *Primary Examiner.*

CLAUDE A LE ROY, *Examiner.*

R. P. SEITTER, *Assistant Examiner.*